United States Patent
Cai et al.

(10) Patent No.: US 7,153,603 B2
(45) Date of Patent: Dec. 26, 2006

(54) PROCESS FOR DECREASING THE RESISTIVITY OF CONDUCTIVE FLOW FIELD PLATES FOR USE IN FUEL CELLS

(75) Inventors: Yuqi Cai, Kingston (CA); Divya Chopra, Kingston (CA); John C. Fisher, Kingston (CA)

(73) Assignee: E. I. duPont Canada Company, Mississauga (CA)

( * ) Notice: Subject to any disclaimer, the term of this patent is extended or adjusted under 35 U.S.C. 154(b) by 477 days.

(21) Appl. No.: 10/390,122

(22) Filed: Mar. 17, 2003

(65) Prior Publication Data

US 2004/0046282 A1    Mar. 11, 2004

Related U.S. Application Data

(60) Provisional application No. 60/366,007, filed on Mar. 20, 2002.

(51) Int. Cl.
  *H01M 8/02*    (2006.01)
  *B29C 71/02*    (2006.01)

(52) U.S. Cl. .................. 429/34; 264/104; 264/235

(58) Field of Classification Search ............... None
  See application file for complete search history.

(56) References Cited

U.S. PATENT DOCUMENTS

| | | | |
|---|---|---|---|
| 4,124,747 A | 11/1978 | Murer et al. | |
| 4,169,816 A | 10/1979 | Tsien | |
| 4,359,438 A | 11/1982 | Hoggins et al. | |
| 4,686,072 A | 8/1987 | Fukuda et al. | |
| 5,591,384 A | 1/1997 | Abrams et al. | |
| 5,637,329 A | 6/1997 | Abrams et al. | |
| 5,776,624 A | 7/1998 | Neutzler | |
| 5,798,188 A | 8/1998 | Mukohyama et al. | |
| 6,103,413 A | 8/2000 | Hinton et al. | |
| 6,180,275 B1 | 1/2001 | Braun et al. | |
| 6,210,789 B1 | 4/2001 | Hanrahan | |
| 6,242,118 B1 * | 6/2001 | Grasso et al. ............... 429/13 |
| 6,248,467 B1 | 6/2001 | Wilson et al. | |
| 6,251,308 B1 | 6/2001 | Butler | |
| 6,322,919 B1 | 11/2001 | Yang et al. | |
| 6,660,420 B1 * | 12/2003 | Yoshida et al. ............ 429/34 |
| 2001/0021470 A1 | 9/2001 | May et al. | |
| 2001/0026893 A1 | 10/2001 | Asukabe et al. | |
| 2001/0031388 A1 | 10/2001 | Hamrock et al. | |

FOREIGN PATENT DOCUMENTS

| | | |
|---|---|---|
| CA | 2306144 | 10/1998 |
| CA | 2346424 | 9/1999 |
| CA | 2351384 | 11/1999 |
| CA | 2352380 | 1/2000 |
| EP | 1061597 | * 12/2000 |
| WO | WO 01/95344 | * 12/2001 |

* cited by examiner

*Primary Examiner*—Jonathan Crepeau

(57) ABSTRACT

The present invention provides a process for decreasing the resistivity of a non-machined conductive flow field plate for use in a fuel cell. The process includes the step of annealing the conductive flow field plate by heating the conductive flow field plate to a temperature between 25° C. (room temperature) and a temperature slightly lower than the material softening temperature of the material composition of the conductive flow field plate; maintaining the conductive flow field plate at that temperature for an effective period of time; and, cooling the conductive flow field plate to room temperature.

12 Claims, 4 Drawing Sheets

PROCESS FOR DECREASING THE RESISTIVITY OF CONDUCTIVE FLOW FIELD PLATES FOR USE IN FUEL CELLS

RELATED APPLICATIONS

This application claims priority from U.S. provisional application Ser. No. 60/366,007 filed Mar. 20, 2002, which is hereby incorporated by reference.

FIELD OF THE INVENTION

This invention relates to fuel cells and in particular to a process for decreasing the resistivity of conductive flow field plates for use in fuel cells.

BACKGROUND OF THE INVENTION

Conductive flow field plates comprise the outer layers of a fuel cell and serve a number of functions; they provide structural integrity to the fuel cell; protect the fuel cell from corrosive degradation over the operating life of the fuel cell; and, most importantly conduct electrons and heat from the interior of the fuel cell to the exterior. Conductivity at the interface between the flow field plate and the outermost interior layer, i.e., gas diffusion layer, is critical for minimizing fuel cell resistance.

Because of the unique set of performance requirements of conductive flow field plates and the aggressive conditions inside the fuel cell, the material options for constructing conductive flow field plates are limited. In general, graphite has been used for conductive flow field plates because of its high electrical conductivity and resistance to corrosion.

Carbon/graphite fillers over plastic polymers have been identified as a promising alternative to graphite in manufacturing conductive flow field plates. Processes for preparing such plates are disclosed in U.S. Pat. No. 4,124,747 A1 to Murer and Amadei, U.S. Pat. No. 4,169,816 A1 to Tsien and U.S. Pat. No. 4,686,072 A1 to Fukuda, which are hereby incorporated by reference.

While these carbon/graphite filler plates provide increased durability and flexibility to the fuel cell, the composition of carbon/graphite filler plates provides less than superior conductivity and resistivity (both bulk resistivity and through plane resistivity) properties. Attempts have been made to reduce the resistivity of a molded plate by machining the surface of the molded plate to eliminate the polymer rich skin layer from the surface of the plate. Such machining processes however are time consuming and expensive.

There therefore remains a need for a convenient post-molding process that improves the resistivity of conductive flow field plates.

SUMMARY OF THE INVENTION

It is an object of the present invention to provide a process for decreasing the resistivity of a conductive flow field plate for use in a fuel cell.

According to one aspect of the invention, there is provided a process for decreasing the resistivity of a non-machined conductive flow field plate for use in a fuel cell wherein the conductive flow field plate has a material softening temperature, the process comprising the steps of (a) heating the conductive flow field plate to a temperature greater than 25° C. but less than the material softening temperature; (b) maintaining the conductive flow field plate at the temperature for an effective period of time; and, (c) cooling the conductive flow field plate to room temperature, wherein the conductive flow field plate is annealed.

The process disclosed by the present invention has many advantages. In particular, the process can decrease the resistivity of conductive flow field plates by up to 30–50%.

Numerous other objectives, advantages and features of the process will also become apparent to the person skilled in the art upon reading the detailed description of the preferred embodiments, the examples and the claims.

BRIEF DESCRIPTION OF THE DRAWINGS

In drawings which illustrate by way of example only a preferred embodiment of the invention.

DETAILED DESCRIPTION OF THE PREFERRED EMBODIMENTS

Figure 1:
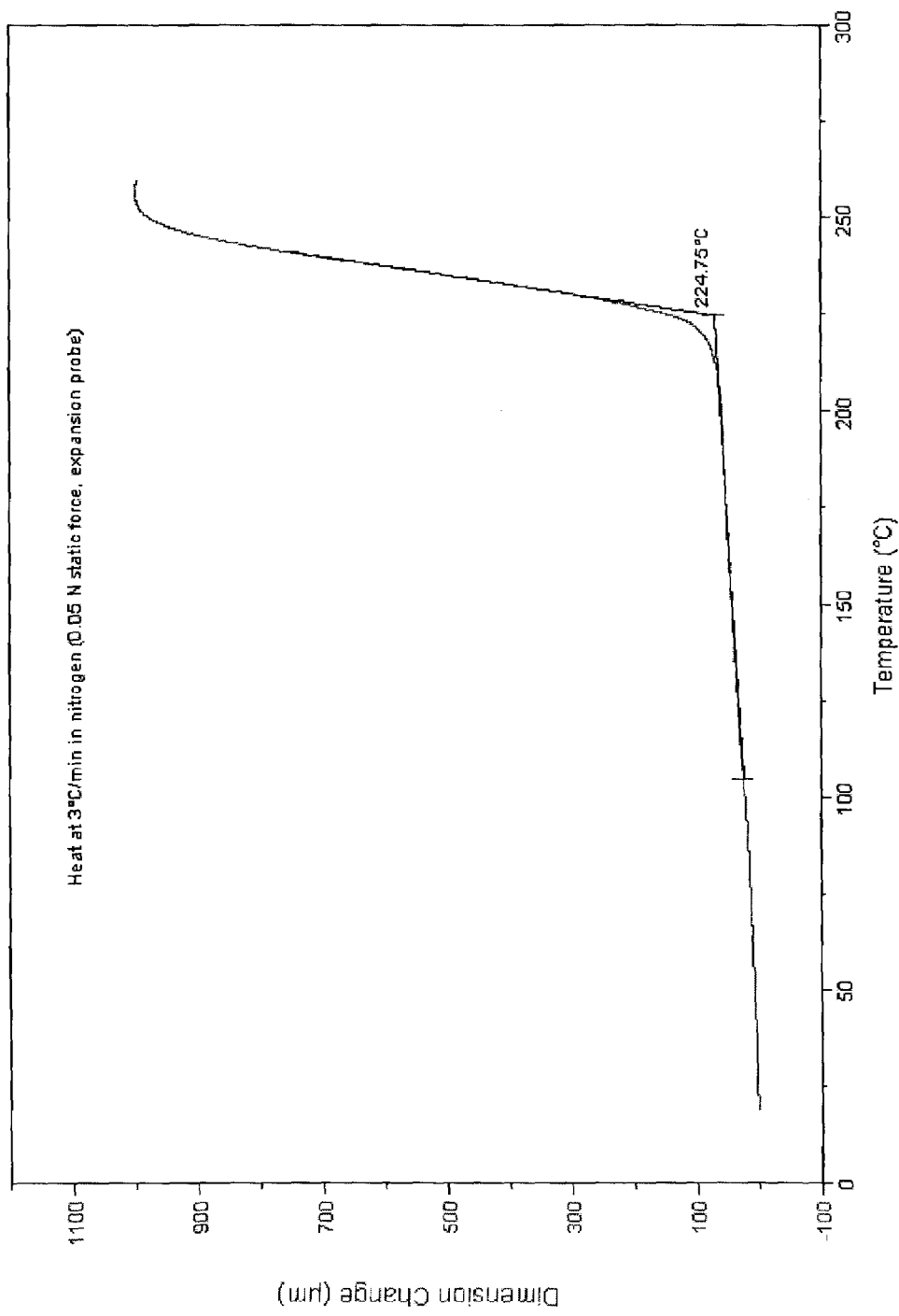
FIG. 1 is a graph illustrating the material softening temperature of a conductive flow field plate comprised of 30% polymer, 20% graphite fiber and 50% graphite powder.

The present invention provides a process for decreasing the resistivity of a conductive flow field plate for use in a fuel cell. The process includes the step of annealing the conductive flow field plate by heating the conductive flow field plate to a temperature between 25° C. (room temperature) and a temperature less than, and preferably slightly lower than, the material softening temperature of the conductive flow field plate; maintaining the conductive flow field plate at that temperature for an effective period of time; and, cooling the conductive flow field plate to room temperature.

The conductive flow field plate is heated by either placing the plate in boiling liquid or by dry heating the conductive flow field plate in an oven. The conductive flow field plate is heated to a temperature between 25° C. (room temperature) and a temperature less than, and preferably slightly lower than, the material softening temperature of the conductive flow field plate, as determined by an expansion probe in a thermal mechanical analyzer (TMA). The material softening temperature is the temperature above which thermal expansion of the material composition of the conductive flow field plate becomes non-linear and is no longer reversible.

It has surprisingly been found that annealing significantly decreases the resistivity of the surface of the conductive flow field plate (bulk resistivity) and the resistivity through the plane of the conductive flow field plate (through plane resistivity). It is speculated that annealing alters the surface morphology of the composition of the conductive flow field plate and promotes heterogeneous distribution of conductive fillers. The preferred annealing temperature correlates with the linear expansion temperature of the material composition of the conductive flow field plate and should preferably always be less than the material softening temperature.

Preferred annealing temperatures will accordingly be dependent on the material composition of the plate, but will generally be between 25° C. and the material softening temperature of the conductive flow field plate, where thermal expansion of the polymer in the composition occurs in a linear, reversible fashion.

In a preferred embodiment, the conductive flow field plate is a carbon/graphite filler plate comprised of ground liquid crystalline polymer, graphite fiber and graphite powder. The polymer can be any liquid crystalline polymer such as liquid crystalline polyester, an engineering thermoplastic, or a blend thereof. Preferably the polymer is an aromatic polyester resin such as that available from E.I. du Pont de Nemours and Company under the trade-mark ZENITE®. The graphite fiber is preferably a pitch-based graphite fiber having a fiber length distribution range from 15 to 500 m, a fiber diameter of 8 to 10 m, bulk density of 0.3 to 0.5 g/cm$^3$ and real density of 2.0–2.2 g/cm$^3$. The graphite powder is preferably a synthetic graphite powder with a particle size distribution range of 20 to 1500 m, a surface area of 2–3 m$^2$/g, bulk density of 0.5–0.7 g/cm$^3$ and real density of 2.0–2.2 g/cm$^3$.

The conductive flow field plate is preferably comprised of 5–40% by weight polymer, 6–95% by weight graphite powder and 0–50% by weight graphite fiber. Most preferably the conductive flow field plate is comprised of 30% by weight polymer, 50% by weight graphite powder and 20% by weight graphite fiber.

Figure 2:
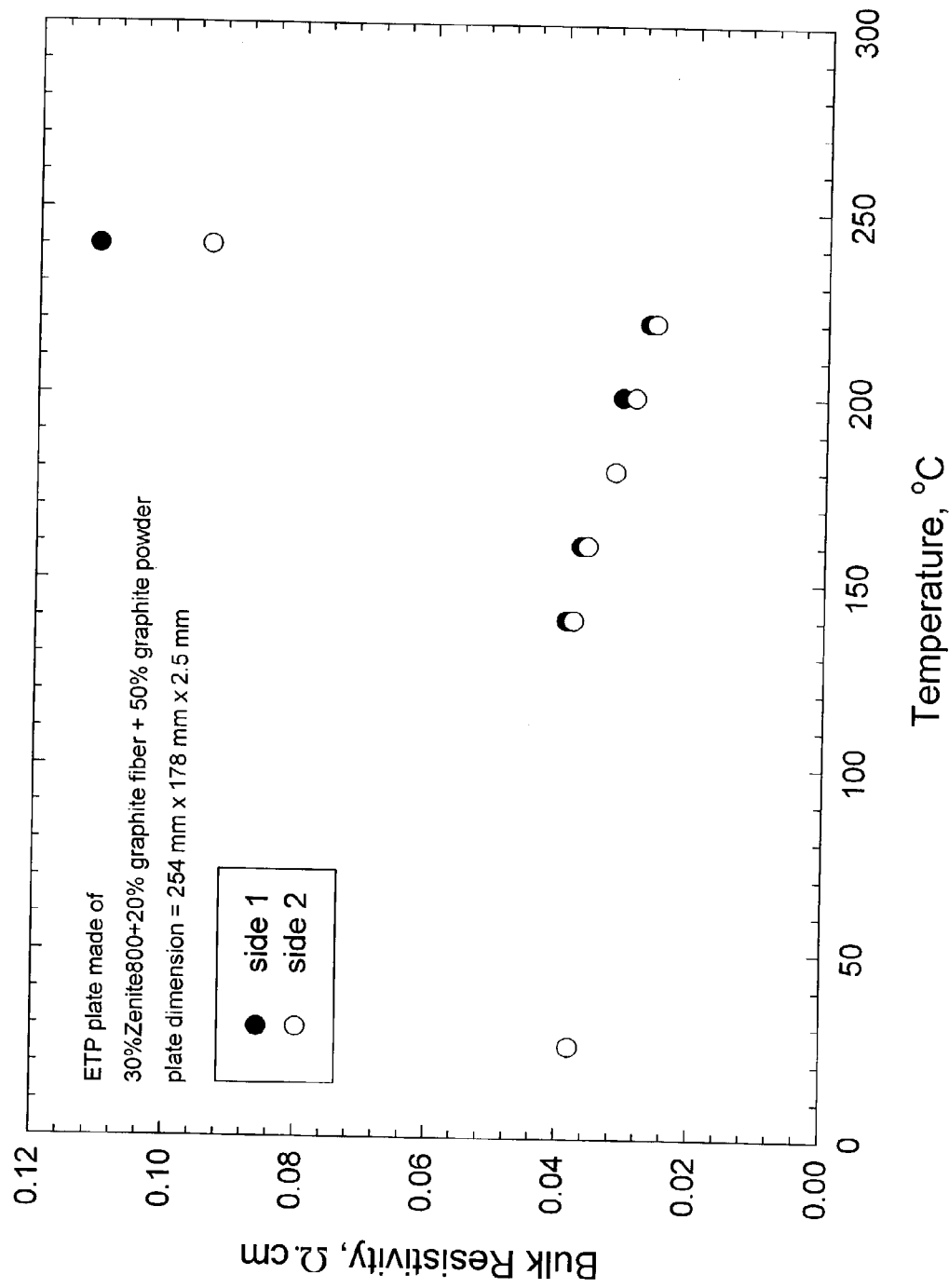
FIG. 2 is a graph illustrating the bulk resistivity of a conductive flow field plate, molded by extrusion transfer pressing ("ETP"), measured as a function of the annealing temperature.

As shown in FIG. 1, the material softening temperature of a conductive flow field plate comprised of 30% ZENITE®, 20% graphite fiber and 50% graphite powder is approximately 225° C. At temperatures greater than 225° C., the polymer expands in a non-linear fashion, increasing the air voids within the plate and the thickness of the plate in the process. As shown in FIG. 2, the bulk resistivity of the conductive flow field plate decreases from 25° C. to 225° C., but increases sharply at temperatures above 225° C.

An increase in the graphite fiber content of the plate will increase the structural integrity of the conductive flow field plate therefore permitting less dimensional change in the conductive flow field plate upon annealing. This corresponds to higher decreases in bulk resistivity as shown in Tables 3 and 4.

Figure 4:
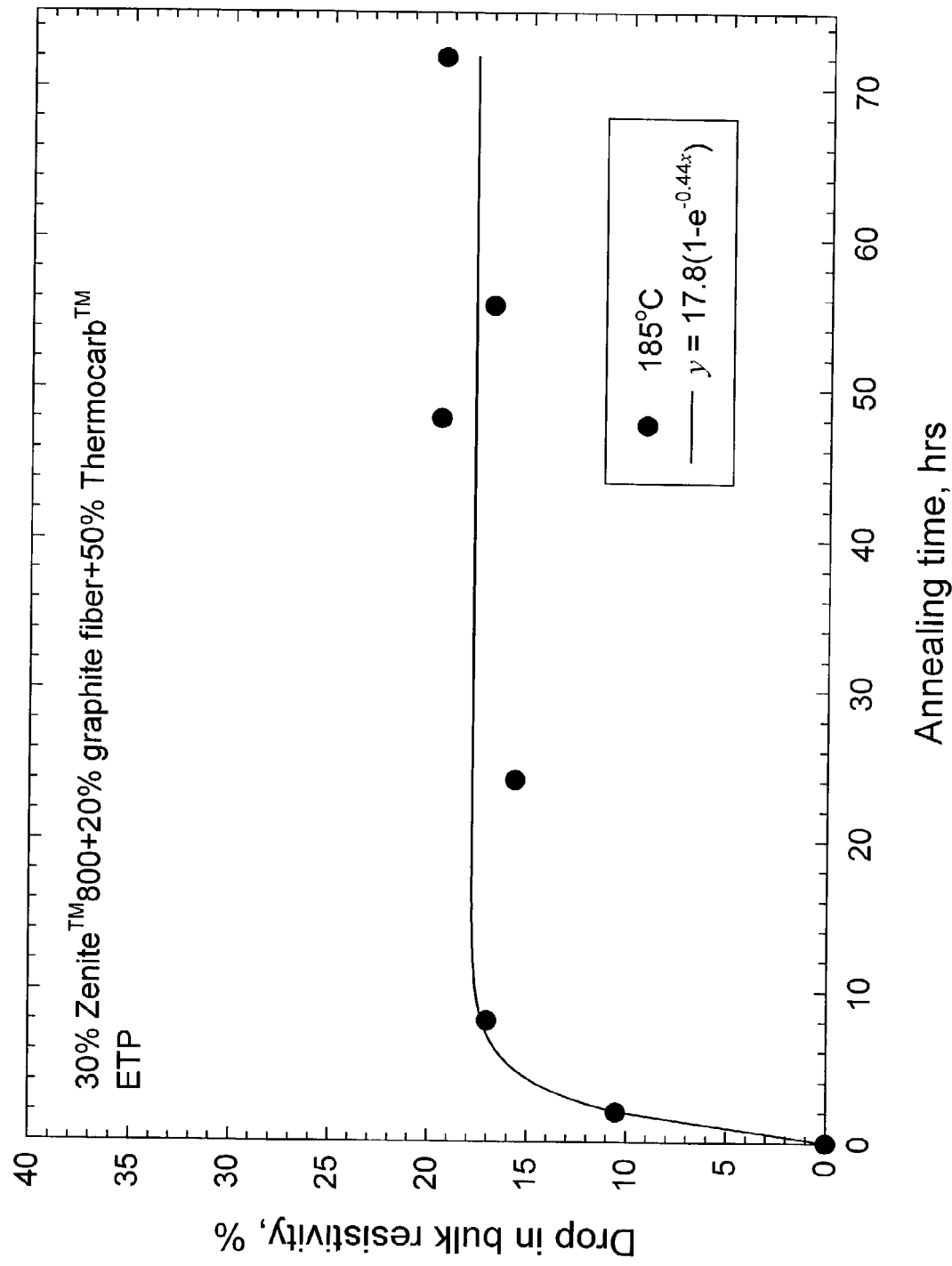

The conductive flow field plate is maintained at the selected annealing temperature for an effective period of time. During this time, the morphology of the polymer of the conductive flow field plate is altered affecting the conductive contact between the graphite fillers in the polymer matrix. As shown in FIG. 4, at 185° C. to achieve maximum decreases in through plane resistivity the effective time for annealing is at least 10 hours. The effective time for annealing may alter depending on the annealing temperature.

The conductive flow field plate is then cooled to room temperature, fixing the morphology of the components of the plate in its altered, annealed form.

Annealing the conductive flow field plate results in a decrease in resistivity, which becomes more significant as the material softening temperature is approached. As shown in the examples, the resistivity (bulk resistivity or through plane resistivity) can be decreased up to 30% in a conductive flow field plate molded by Extrusion Transfer Pressing (ETP) technique (Examples 1 and 2) with a further decrease in resistivity to at least 50% of a compression molded plate (Example 3).

Figure 3:
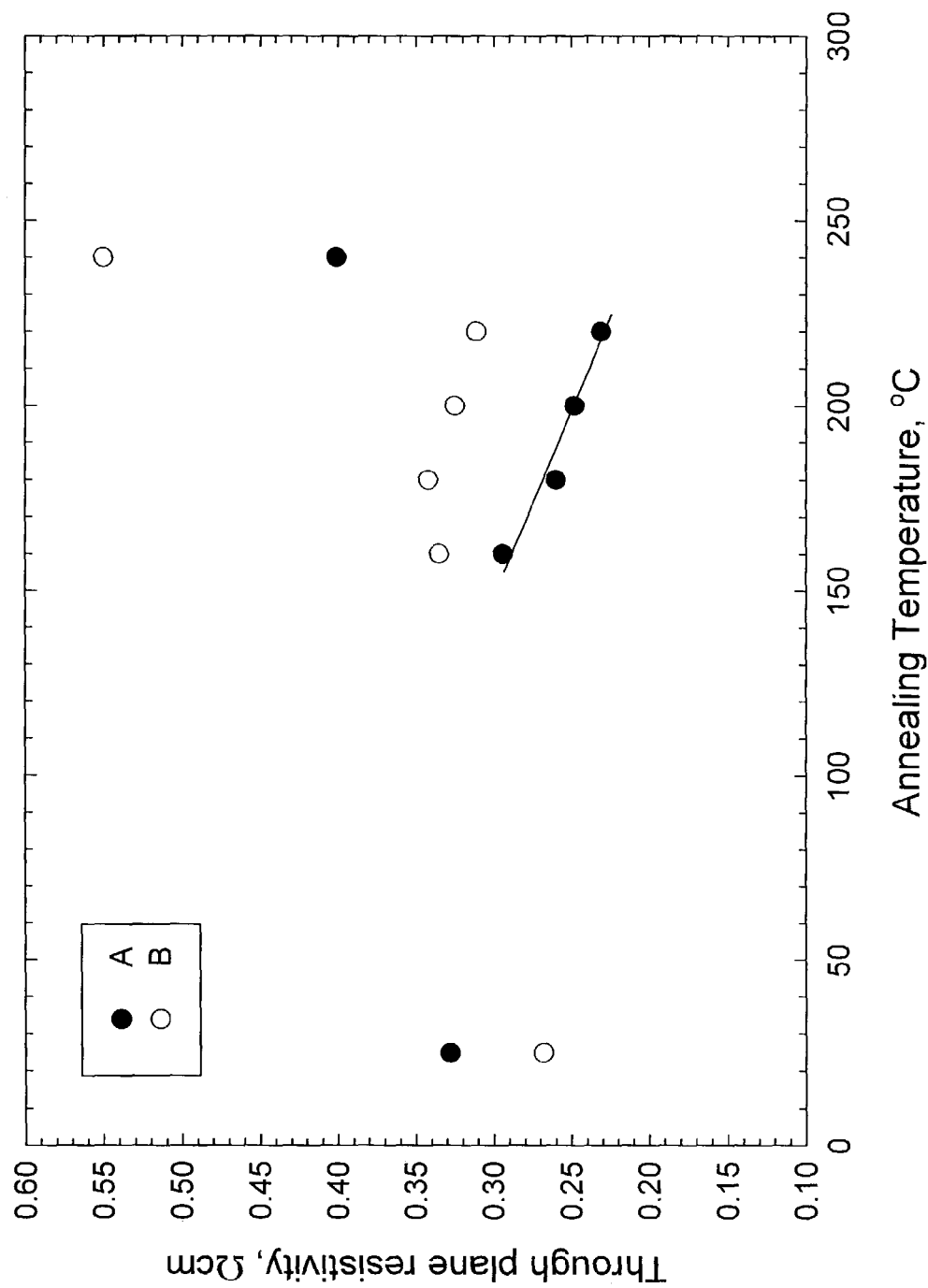
FIG. 3 is a graph comparing the through plane resistivity of machined and non-machined ETP conductive flow field plates, measured as a function of the annealing temperature; and, FIG. 4 is a graph depicting the effect of annealing time on the through plane resistivity of ETP conductive flow field plates heated to a temperature of 185° C.

This decrease in resistivity is greater than that obtained from machined conductive flow field plates. As shown in FIG. 3, a machined conductive flow field plate, i.e. a plate with a shaved outer skin on both sides, has lower resistivity to start. However, the resistivity increases with increasing annealing temperatures.

The following examples further illustrate the invention.

EXAMPLES

In these examples, the conductive flow field plates are graphite filler plates comprised of a dry mixture of ground liquid crystalline polymer, graphite fiber and/or graphite powder.

The conductive flow field plates were molded by either compression molding or Extrusion Transfer Pressing (ETP) technique. The details of these molding processes are set out in U.S. Pat. No. 5,637,329 and U.S. Pat. No. 5,591,384, which are hereby incorporated by reference.

The bulk resistivity ($\rho$) of the conductive flow field plates is measured using the standard four point method. The standard four point method is performed in accordance with the method described in Wieder, HH, Laboratory Notes on Electrical and Galvanomagnetic Measurements, Material Science Monograph, Vol. 2, Elsevier Pub., Amsterdam, 1979, which is herein incorporated by reference. A current (I) is injected at the first of four linear equi-spaced point electrode probes and collected at the fourth electrode, while the potential difference $\Delta V$ between the second and third electrodes is measured. The resistivity ($\rho$) is determined using the following equation where T is the thickness of the sample, and R is the measured resistance.

$$\rho = 4.53RT$$

Through plane resistivity is measured using the contact resistance method, the conductive flow field plate is placed between two gold plates at 314 psi. A power supply sends a known current through the gold plates and resistance (R) is calculated using Ohm's Law, i.e., the formula I=V/R, where I is the current in amps and V is the potential drop in mV as read multimeter. Through plane resistivity can be calculated using the equation: $\rho = R \times A/T$, where A is the area of the plate and T is the thickness of the plate.

Example 1

Example 1 compares the bulk resistivity of a conductive flow field plate annealed at temperatures between 25° C. and 240° C.

A 254 mm×178 mm×2.5 mm ETP molded plate comprising 30% by weight ground Zenite® resin, 20% by weight graphite fiber and 50% by weight graphite powder was annealed at temperatures between 25 and 240° C., by sandwiching the conductive flow field plate between two aluminum shims and placing the shims between the platens of a press at the desired temperature. The conductive flow field plate was heated for 10 minutes and then taken out of the press and allowed to cool to room temperature. The bulk resistivity of each side of the conductive flow field plate was measured at 5 different points using a 4-point probe. The process was repeated for each of the following temperatures 25° C., 140° C., 160° C., 180° C., 200° C., 220° C., and 240° C. As shown in Table 1 and FIG. 2, the bulk resistivity of the conductive flow field plate dropped as a function of annealing temperature by about 18–23% at temperatures between 25 and 220° C.

TABLE 1

Bulk resistivity measurements for each side of the
conductive flow field plate annealed at temperatures
between 25° C. and 240° C.

| Temp, ° C. | Thickness, mm | Average Bulk Resistivity (ohm · cm) Side 1 | Average Bulk Resistivity (Ohm · cm) Side 2 |
|---|---|---|---|
| 25 | 2.50 | 0.038 | 0.038 |
| 140 | 2.52 | 0.039 | 0.038 |
| 160 | 2.54 | 0.037 | 0.036 |
| 180 | 2.54 | 0.032 | 0.032 |
| 200 | 2.56 | 0.031 | 0.029 |
| 220 | 2.58 | 0.027 | 0.026 |
| 240 | 2.86 | 0.111 | 0.094 |

Example 2

Example 2 compares the change in through plane resistivity of an ETP molded conductive flow field plate and a surface machined ETP molded conductive flow field plate upon annealing at different temperatures.

A 254 mm×178 mm×2.5 mm ETP conductive flow field plate comprising 30% by weight ground ZENITE® resin, 20% by weight graphite fiber and 50% by weight graphite powder was cut into 2 conductive flow field plates of the following dimension:

a. 137 mm×75 mm×2.47 mm; area on one side=102.75 cm².
b. 101.6 mm×101.6 mm×2.06 mm; area on one side=103.23 cm².

Plate B was machined on both surfaces. Plates A and B were annealed at temperatures between 25° C. and 240° C., by sandwiching the conductive flow field plates between two aluminum shims and placing the shims between the platens of a press at the desired temperature. The conductive flow field plates were heated for 30 minutes and then taken out of the press and allowed to cool to room temperature. The through plane resistance of the conductive flow field plates was measured using the contact resistance method.

As shown in Table 2 and FIG. 3, a molded non-machined plate showed a drop of ~30% in through plane resistivity as the annealing temperature was increased from 25° C.–220° C. A machined plate, on the other hand, showed a general increase in through plane resistivity with increased annealing temperatures. The drop in through plane resistivity of the non-machined conductive flow field plate was most significant at around 220° C. to 223° C., just before reaching the material softening temperature.

TABLE 2

Through Plane Resistivity of Machined and Non-machined
Conductive flow field Plates Upon Annealing at Temperatures
from 25° C. to 240° C.

| Annealing Temp, ° C. | Thickness Non-machined plate, mm | Average Calculated resistivity Non-machined Plate (Ωcm) | Thickness Machined Plate, mm | Average Calculated resistivity Machined Plate (Ωcm) |
|---|---|---|---|---|
| 25 | 2.47 | 0.328 | 2.06 | 0.268 |
| 160 | 2.47 | 0.294 | 2.15 | 0.335 |
| 180 | 2.54 | 0.260 | 2.12 | 0.342 |
| 200 | 2.51 | 0.248 | 2.12 | 0.325 |
| 220 | 2.51 | 0.231 | 2.14 | 0.311 |
| 240 | 2.67 | 0.401 | 2.19 | 0.550 |

Example 3

Example 3 illustrates the through plane resistivity of a compression molded conductive flow field plate annealed at 80° C. in a mixture of methanol and water.

50 g of each plate composition (see Table 3) was placed into a mold and pressed at 320° C. under 2–4 tons of pressure for 5–10 minutes. The pressure was increased to 7.5–10 tons for 10 minutes and reduced to 10–20 tons for 2 minutes. The mold was cooled to 90° C. under 10–20 tons of pressure. The plates were 101.6 mm×101.6 mm with 2–3 mm thickness. Initial resistance was measured using the contact resistance press method as set out in the second column of Table 4.

The plates were annealed at 80° C. for 500 hours in a bath of 15% methanol in deionized water using a 4 L kettle and a heating mantle fitted with a Graham condenser. The plates were hung into the bath using Teflon tape. The pH of the bath was adjusted to 4 using sulfuric acid to create a corrosive environment within the bath. At the end of the annealing process, the conductive flow field plate was cooled to room temperature and through plane resistivity was measured using the contact resistance press method.

As shown in Table 4, through plane resistivity was decreased upon prolonged heating at 80° C. The change in the thickness of the conductive flow field plate was only minor indicating that expansion of the polymer was linear in nature.

The initial through plane resistivity of the conductive flow field plate comprised of 50% fiber (plate C—see Table 3) was greater than the initial through plane resistivity of the conductive flow field plates (plates A and B—see Table 3) comprising of 0 and 20% by weight fiber. However, the decrease in through plane resistivity of plate C was more significant following annealing, as a result of the higher fiber content of the conductive flow field plate and accordingly higher structural integrity of the conductive flow field plate.

TABLE 3

Composition of Plates in % by weight.

| | Plates | | |
|---|---|---|---|
| Ingredients | A | B | C |
| LCP (Zenite ™6000) % | 30.0 | 30.0 | 30.0 |
| Graphite powder % | 70.0 | 50.0 | 20.0 |
| Pitch fiber % | 0.0 | 20.0 | 50.0 |

TABLE 4

The drop in through plane resistivity along with weight loss
and thickness increase due to annealing in a liquid bath

| Plate # | Initial through plane resistivity ohm · cm | Final through plane resistivity ohm · cm | Weight loss, % | Thickness increase, % |
|---|---|---|---|---|
| A | 0.090 | 0.055 | 0.02 | 2.05 |
| B | 0.088 | 0.055 | 0.03 | 1.17 |
| C | 0.121 | 0.065 | 0.03 | 0.50 |

Example 4

Example 4 illustrates the effect of annealing time on bulk resistivity of the conductive flow field plate. A 254 mm×178 mm×2.67 mm ETP molded conductive flow field plate comprised of 30% by weight ground Zenite® resin, 20% by weight graphite fiber and 50% by weight graphite powder was cut down into 6 plate pieces of 1.5"×1.5" each.

The bulk resistivity of each of the plate pieces was measured at room temperature using the four-point method. The plate pieces were then heated to 185° C. and maintained at this temperature for either 2, 8, 24, 48, 55.5 or 72 hours. The plates were then cooled back down to room temperature to complete the annealing process.

Bulk resistivity of the conductive flow field plate was measured using a 4-point probe on five different points on both sides of each plate. The bulk resistivity measurements are depicted in Table 5 and FIG. 4.

As shown in FIG. 4, bulk resistivity dropped by approximately 19% after about 10 hours, after which time no further drop in bulk resistivity was observed. The dimensional change in the conductive flow field plate (not shown) due to annealing was less than 5% in all cases.

TABLE 5

Drop in Bulk Resistivity as a Function of Annealing Time

| Annealing Time, hours | Initial Bulk Resistivity (ohms · cm) | Bulk Resistivity (ohms · cm) after annealing | % drop in bulk resistivity |
| --- | --- | --- | --- |
| 2 | 0.066 | 0.059 | 10.51 |
| 8 | 0.057 | 0.048 | 17.00 |
| 24 | 0.063 | 0.055 | 15.64 |
| 48 | 0.082 | 0.066 | 19.50 |
| 55.5 | 0.053 | 0.044 | 16.89 |
| 72 | 0.097 | 0.078 | 19.39 |

Although the present invention has been shown and described with respect to its preferred embodiments, it will be understood by those skilled in the art that other changes, modifications, additions and omissions may be made without departing from the substance and the scope of the present invention as defined by the attached claims.

What is claimed is:

1. A process for decreasing the resistivity of a conductive flow field plate for use in a fuel cell wherein the conductive flow field plate is comprised of liquid crystalline polyester and has a material softening temperature, the process comprising the steps of:

(a) heating the conductive flow field plate to a temperature of at least 180° C. but less than the material softening temperature of the plate;
   (b) maintaining the conductive flow field plate at the temperature for an effective period of time; and,
   (c) cooling the conductive flow field plate to room temperature, wherein the conductive flow field plate is thereby annealed.

2. The process of claim 1 wherein the conductive flow field plate is made by molding graphite filled liquid crystalline polyester polymer.

3. The process of claim 2 wherein the conductive flow field plate comprises from about 5 to about 40% by weight polymer, from about 6 to about 95% by weight graphite powder and from 0 to about 50% by weight graphite fiber.

4. The process of claim 3 wherein the conductive flow field plate comprises about 30% by weight polymer, about 50% by weight graphite powder and about 20% by weight graphite fiber.

5. The process of claim 3, wherein the conductive flow field plate comprises about 30% by weight polymer, about 20% by weight graphite powder and about 50% by weight graphite fiber.

6. The process of claim 3, wherein the conductive flow field plate comprises about 30% by weight polymer and about 70% by weight graphite powder.

7. The process of claim 2 wherein the conductive flow field plate is made by compression molding.

8. The process of claim 7 wherein the resistivity is decreased by up to about 50%.

9. The process of claim 1 wherein the conductive flow field plate is molded using extrusion transfer pressing technique.

10. The process of claim 9 wherein resistivity is decreased by up to about 30%.

11. The process of claim 2 wherein the temperature is at least 200° C.

12. The process of claim 11 wherein the conductive flow field plate is maintained at the temperature for at least 10 hours.

* * * * *